(12) United States Patent
Sheinson et al.

(10) Patent No.: US 7,050,982 B2
(45) Date of Patent: May 23, 2006

(54) LEAD GENERATION SYSTEM USING BUYER CRITERIA

(75) Inventors: Michael Sheinson, Highland Beach, FL (US); Art DeLaurier, Parkland, FL (US); Mike McFall, Parkland, FL (US); Santiago Ramirez, Lake Worth, FL (US)

(73) Assignee: Veretech, LLC, FL (US)

( * ) Notice: Subject to any disclaimer, the term of this patent is extended or adjusted under 35 U.S.C. 154(b) by 191 days.

(21) Appl. No.: 10/640,852

(22) Filed: Aug. 14, 2003

(65) Prior Publication Data

US 2004/0172266 A1   Sep. 2, 2004

Related U.S. Application Data

(60) Provisional application No. 60/403,272, filed on Aug. 14, 2002.

(51) Int. Cl.
    *G06Q 99/00* (2006.01)
(52) U.S. Cl. ............................ 705/1; 705/26
(58) Field of Classification Search ...................... None
     See application file for complete search history.

(56) References Cited

U.S. PATENT DOCUMENTS

| | | | |
|---|---|---|---|
| 5,317,503 A | | 5/1994 | Inoue |
| 5,493,490 A | * | 2/1996 | Johnson ................. 705/26 |
| 5,521,815 A | | 5/1996 | Rose, Jr. |
| 5,717,595 A | | 2/1998 | Cherrington et al. |
| 5,797,134 A | | 8/1998 | McMillan et al. |
| 6,041,310 A | | 3/2000 | Green et al. |
| 6,052,631 A | | 4/2000 | Busch et al. |
| 6,064,970 A | | 5/2000 | McMillan et al. |
| 6,076,064 A | | 6/2000 | Rose, Jr. |

FOREIGN PATENT DOCUMENTS

JP   410222559 A   *   8/1998   ..................... 705/1

OTHER PUBLICATIONS

Declaration of Michael J. Fisher as executed on Jun. 27, 2005, entire document.*
N.A.D.A. web page from Jan. 25, 2002, entire document.*
Computer screenshots of Web pages representative of those produced by Applicants' online valuation system more than one year prior to the filing of U.S. Appl. No. 60/403,272, filed Aug. 14, 2002.
Computer screenshots of Web pages representative of those produced by Applicants' online valuation system after the filing of U.S. Appl. No. 60/403,272, filed Aug. 14, 2002.

* cited by examiner

*Primary Examiner*—John G. Weiss
*Assistant Examiner*—Michael J. Fisher
(74) *Attorney, Agent, or Firm*—DLA Piper Rudnick Gray Cary US LLP

(57) ABSTRACT

The invention is directed to a system for generating a lead by determining an estimated for a vehicle. The system may receive vehicle identifying information; receive seller identifying information; receive information for a sample of vehicles of the same make and model as the vehicle; determine a value for vehicle using the vehicle identifying information and the historical information, wholesale sales through auctions and at dealerships; (and also vehicle condition information if provided), and determine an estimated value, estimated value range, or offer price for the vehicle using predetermined buyer criteria and the determined value. This offer may then be transmitted to the seller in the form of a price certificate, appraisal report, etc., and the seller identifying information may be transmittal to the buyer as a sales lead.

9 Claims, 27 Drawing Sheets

Figure 2(c)

Describe the condition of your vehicle

Exterior

| | | | |
|---|---|---|---|
| Body | ⦿ Good | ○ Some Dings/Dents | ○ Major Damage |
| Paint | ○ Still Shines | ⦿ Dull/Chips/Scratches | ○ Major flaws/peeling |
| Glass | ⦿ Good | ○ Chipped/Pitted | ○ Cracked |
| Lights | ⦿ Good | ○ Replacement | |
| Rust | ⦿ None | ○ Some | ○ Rusted Through |
| Hail Damage | ○ None | ⦿ Some | ○ Major |
| Unibody/Frame | ⦿ Good | ○ Was Repaired | ○ Damaged |
| Spent On Collision Repair | ⦿ None | ○ Less than $2,500 | ○ More than $2,500 |

Interior

| | | | |
|---|---|---|---|
| Door Panels | ⦿ Good | ○ Some Flaws | ○ Damaged |
| Carpets/Mats | ○ Good | ⦿ Some Flaws | ○ Damaged |
| Upholstery | ⦿ Good | ○ Some Flaws | ○ Damaged |

Does the Vehicle have any mechanical problems?   ⦿ Yes   ○ No

☐ Engine is Noisy or Smokes
☐ Head Gasket Leaking or Water in the Oil

LEAD GENERATION SYSTEM USING BUYER CRITERIA

CROSS-REFERENCE TO RELATED APPLICATIONS

This application claims the priority of U.S. Provisional Patent Application Ser. No. 60/403,272, filed on Aug. 14, 2002, which is herein incorporated in its entirety by reference.

FIELD OF THE INVENTION

The invention relates to a system for generating leads for the sale of vehicles. More particularly, the invention relates to a system for generating leads by determining an offer price for a vehicle using historical data, such as wholesale sales that occur at vehicle auctions and dealerships, and dealer selected buyer criteria. Even more particularly, the invention relates to an online system for generating leads by determining an offer price for a vehicle using this information.

BACKGROUND

In order to acquire a new vehicle, the consumer who intends to dispose of their current vehicle must complete at least three major processes. These operations can either be performed online, in the traditional fashion at the dealership, or through a combination of both the online and traditional settings.

For example, if the consumer is using the Internet to complete these operations, then they are completed as follows. The consumer first selects the new vehicle, either by browsing through the inventory of vehicles that the dealer currently has on hand, or by using configuration software to select the vehicle and the various options desired. Next, the consumer determines the value of the vehicle that he or she is currently driving, and ascertains how or if the value derived from that vehicle will contribute to the acquisition of the new vehicle. Finally the consumer considers how he/she will pay for or finance the remainder, once the value of the current vehicle is subtracted from the cost of the new one.

Each of these steps needs to be completed in order for the consumer to acquire a replacement vehicle. The steps do not necessarily have to be performed in a serial fashion, and thus, some customers will first ascertain how much their trade-in is worth, while others will want to understand if their credit rating is adequate for them to finance a new vehicle. Most consumers will select the new vehicle first, and will generally do that by accessing a Web site operated by an vehicle manufacturer, an portal, and/or a franchised dealer close to their home or place of work.

A number of systems exist in the prior art for determining the value of a used automobile. A number of these prior art systems also allow for this valuation to be conducted over the Internet. Examples include the National Automobile Dealers' Association ("NADA."), which allows users to determine the value of a used vehicle through their Web site at www.nadaguides.com; and the Kelley Blue Book, which allows consumers to determine the value of a used car through their Web site at www.kbb.com.

However, these sites do not allow the consumer to obtain an actual offer on a vehicle from a dealer. As a result, other systems have been developed in the prior art that allow the consumer to obtain an actual offer for their used vehicle over the Internet using an interactive Web site. For example, one such site can be found at www.buyfigure.com. In order to obtain a price offer using this system, the consumer enters the VIN number for a particular vehicle and completes a questionnaire. This information is then submitted to the BuyFigure Web site where a price is determined for the vehicle. This price is returned to the user in the form of a demand certificate. This demand certificate can be used to sell the vehicle to any dealer that is franchised in the BuyFigure system.

Unfortunately, such systems have the significant disadvantage that they do not allow the dealer to customize an offer for the vehicle based upon dealer designated buying criteria. This is a significant disadvantage, since particular dealers may want to adjust their offer price based upon factors that are of importance to them specifically. Moreover, such sites do not refer the consumer (and generate leads) from the dealer's own Web site. This is a significant disadvantage as such systems can not readily be used as a lead generating engine for specific participating dealers.

Accordingly, a system is needed that serves both the consumer and the automobile dealer; and which enables a dealership to ascertain the actual wholesale value of the vehicle and to alter the offer price or other estimated value based upon the dealer's current buying criteria. The system may also enable consumers who are seeking to part with their current vehicle to secure a firm offer from a participating dealer, who is willing to purchase the vehicle. The system is preferably accessible via the Internet, served to the user via an existing Web site operated by the dealer or an automotive portal.

SUMMARY OF THE INVENTION

Embodiments of the invention may incorporate a system for generating leads for the sale of vehicles. This may include a system for generating leads for the sale of a vehicle by determining an offer price by a buyer, typically a dealer, for a vehicle for sale by a seller, typically a consumer. The system is preferably accessed by the seller over the Internet, such as through the use of an interactive dealer Web site, but may also be used locally, such as by a customer and/or dealer in a dealer showroom.

The invention is preferably engaged when a consumer decides to obtain an offer for the value for a vehicle from a dealer. The value of the vehicle and/or a dealer's offer can be used as a credit toward the purchase of another vehicle. Through a connection to the Internet, the consumer can use a browser to access a local or remote Internet Web site and interact with the system. After supplying the necessary information, the consumer will receive an offer from the dealer that may be used in buying or trading-in the vehicle. This offer may take the form, for example, of a demand certificate, an appraisal report, an estimated value, and/or an estimated value range.

This may preferably be accomplished through the use of a series of forms that are provided by the user interface to the Web site. The information provided by the consumer is then preferably stored in a data source, although this is not required. A data source interface, which is in communication with the user interface and the data source, can then use this information to determine the current value of the vehicle. The data source interface can also access historical data, such as wholesale sales that occur at vehicle auctions and dealerships, and dealer specified buying criteria is preferably stored in a dealer profile if in the data source. This information can be used to generate the offer for the vehicle, which can then be refined by using specific buying criteria before being sent to the consumer.

BRIEF DESCRIPTION OF THE DRAWINGS

The foregoing and other aspects and advantages will be better understood from the following detailed description of the invention with reference to the drawings, in which:

Figure 2C:
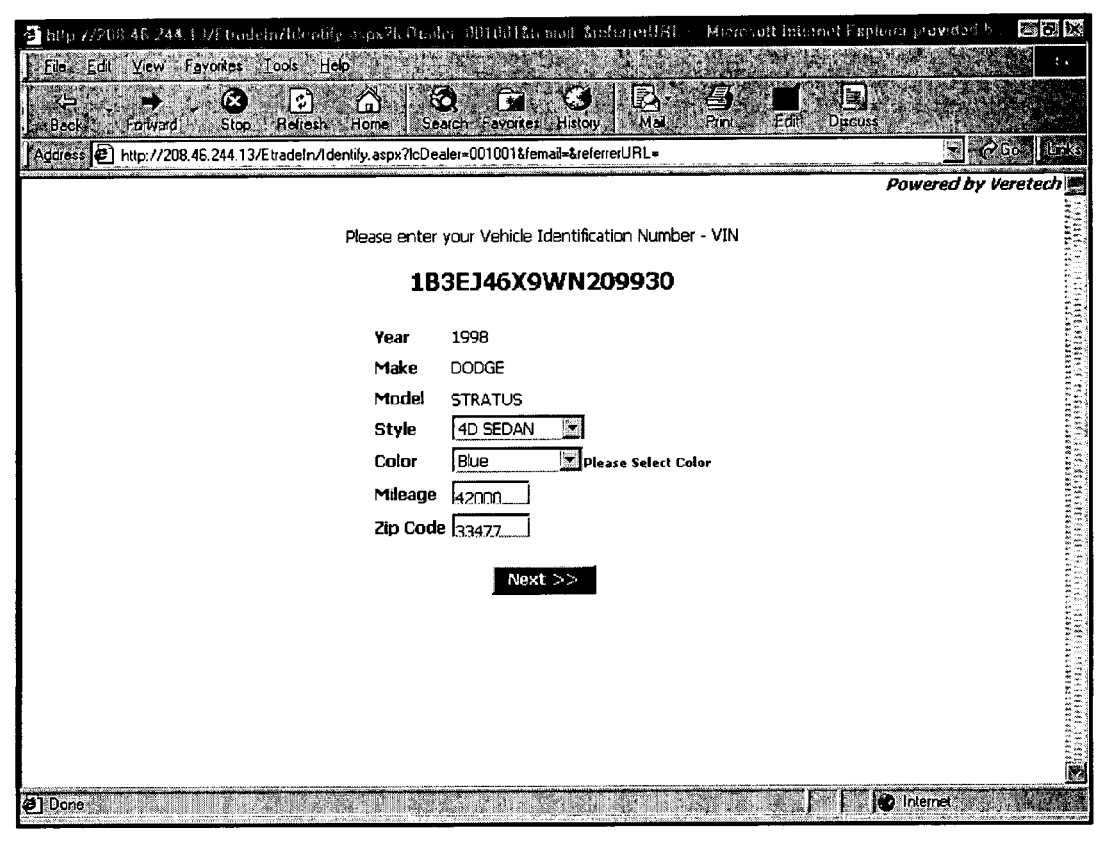
Figure 2F:
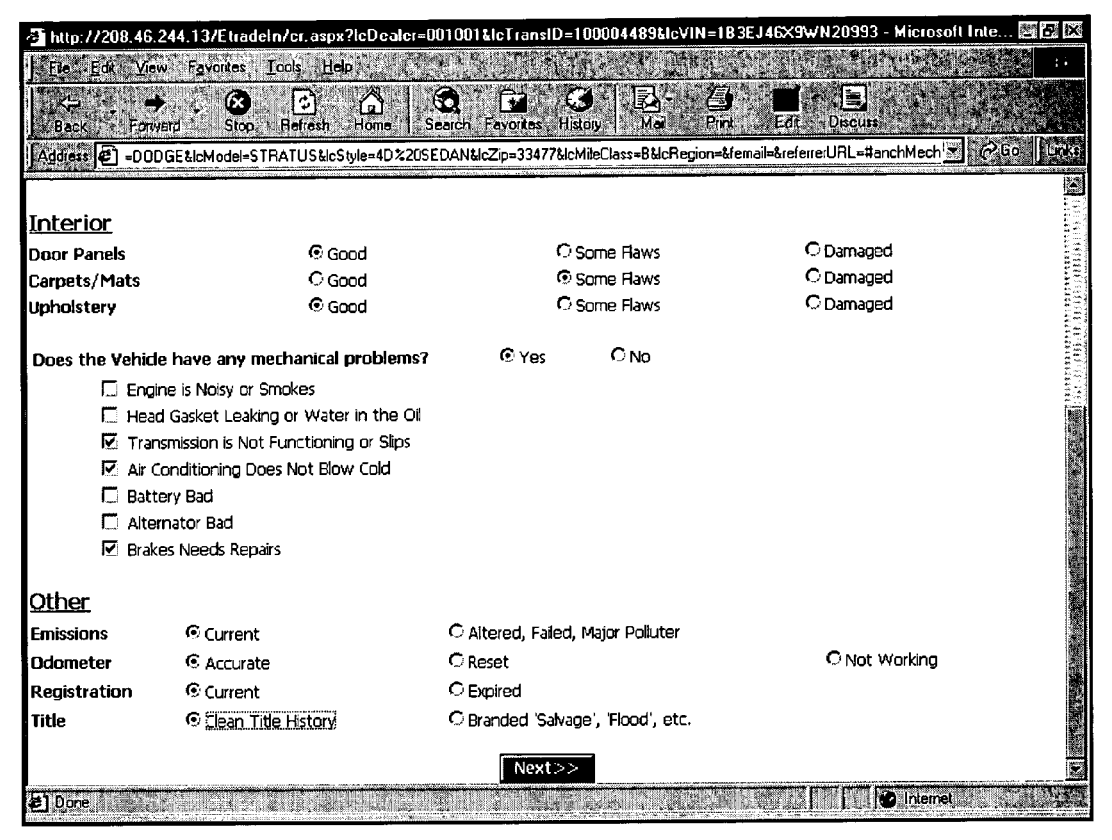
Figure 2G:
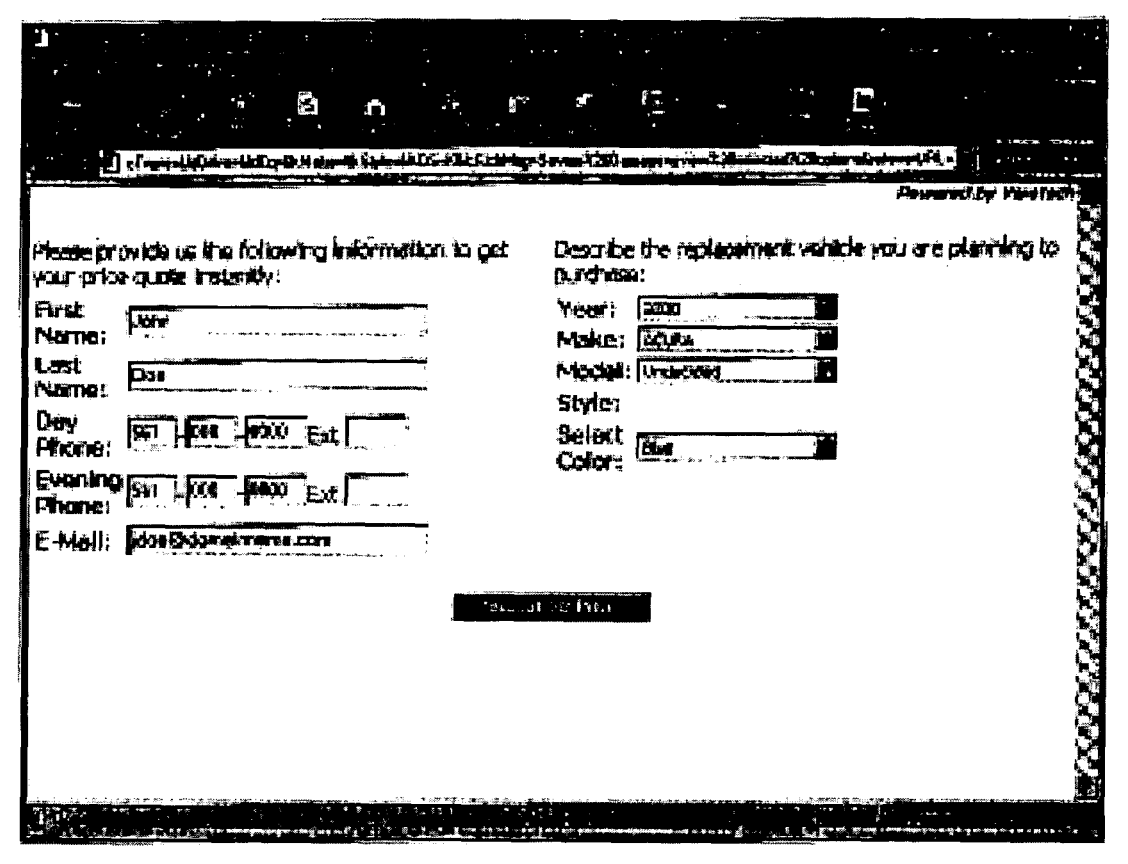

FIGS. 2(a)–(f), 3(a)–(g), and 4(a)–(e) are computer screen shots of preferred embodiments of Web page forms for submitting vehicle identification and condition information in accordance with the system of the invention;

FIGS. 2(g), 3(h), and 4(f) are computer screen shots of preferred embodiments of a Web page form for submitting seller identifying information in accordance with the system of the invention;

FIGS. 3(g) and 4(i) are computer screen shots of a preferred embodiment of a Web page estimated value in accordance with the system of the invention.

FIGS. 3(h) and 4(j) are computer screen shots of a preferred embodiment of an email-based appraisal report in accordance with the system of the invention.

DETAILED DESCRIPTION

The invention will be understood more fully from the detailed description given below and from the accompanying drawings of preferred (but not exclusive) embodiments of the invention; which, however, should not be taken to limit the invention to a specific embodiment but are for explanation and understanding only.

Figure 1:
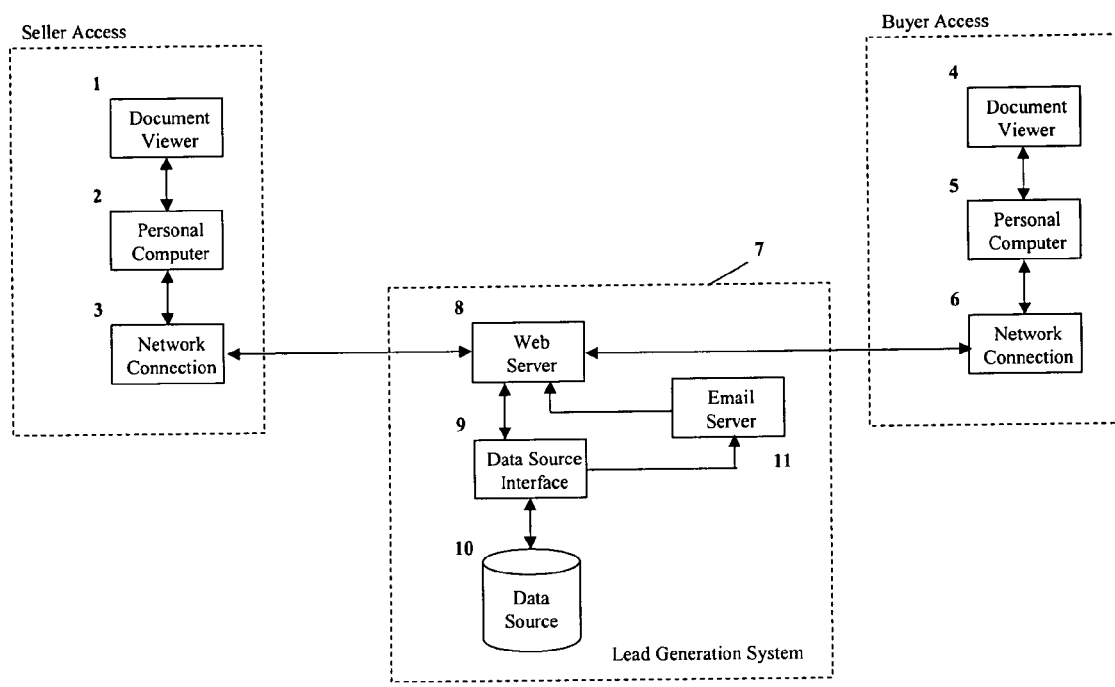
FIG. 1 is a diagram of a preferred embodiment of the invention used over the Internet.
Figure 2A:
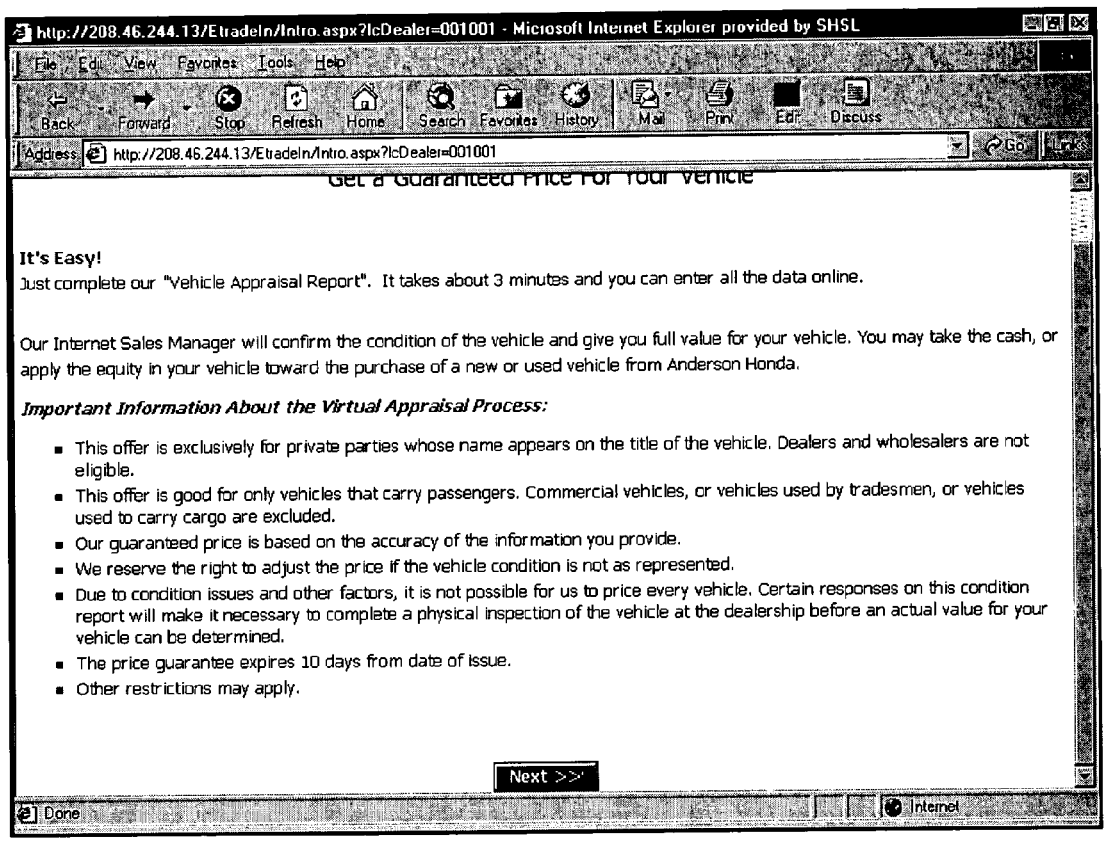
Figure 2B:
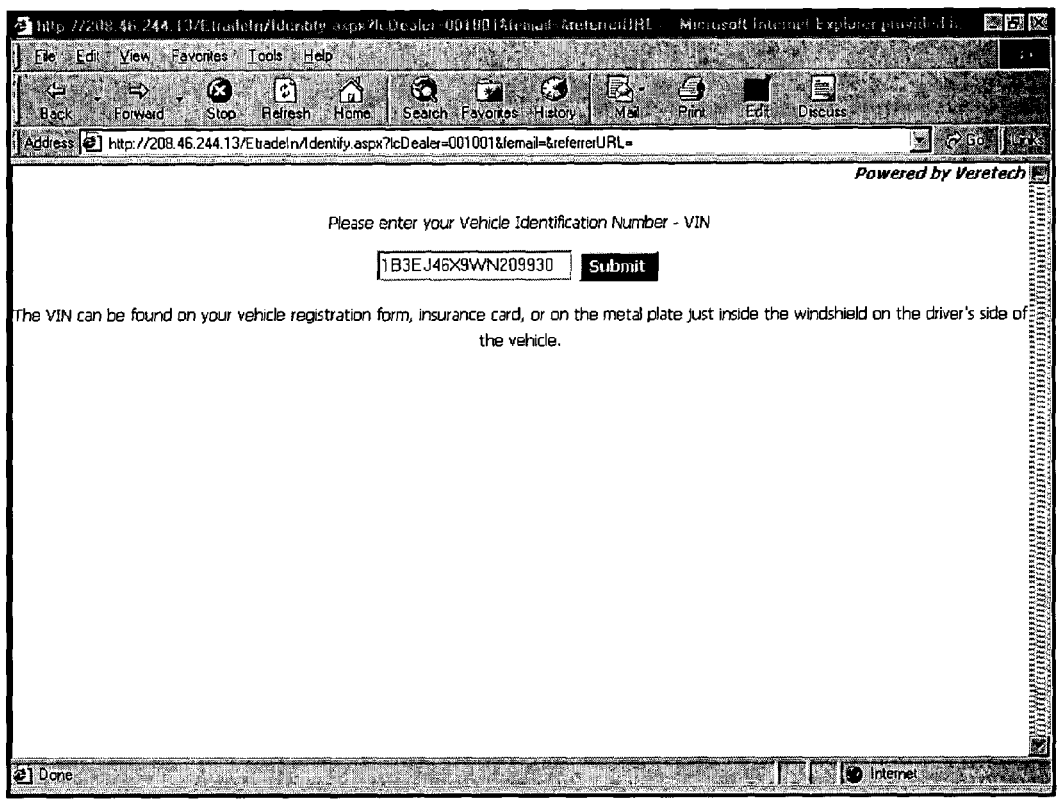
Figure 2D:
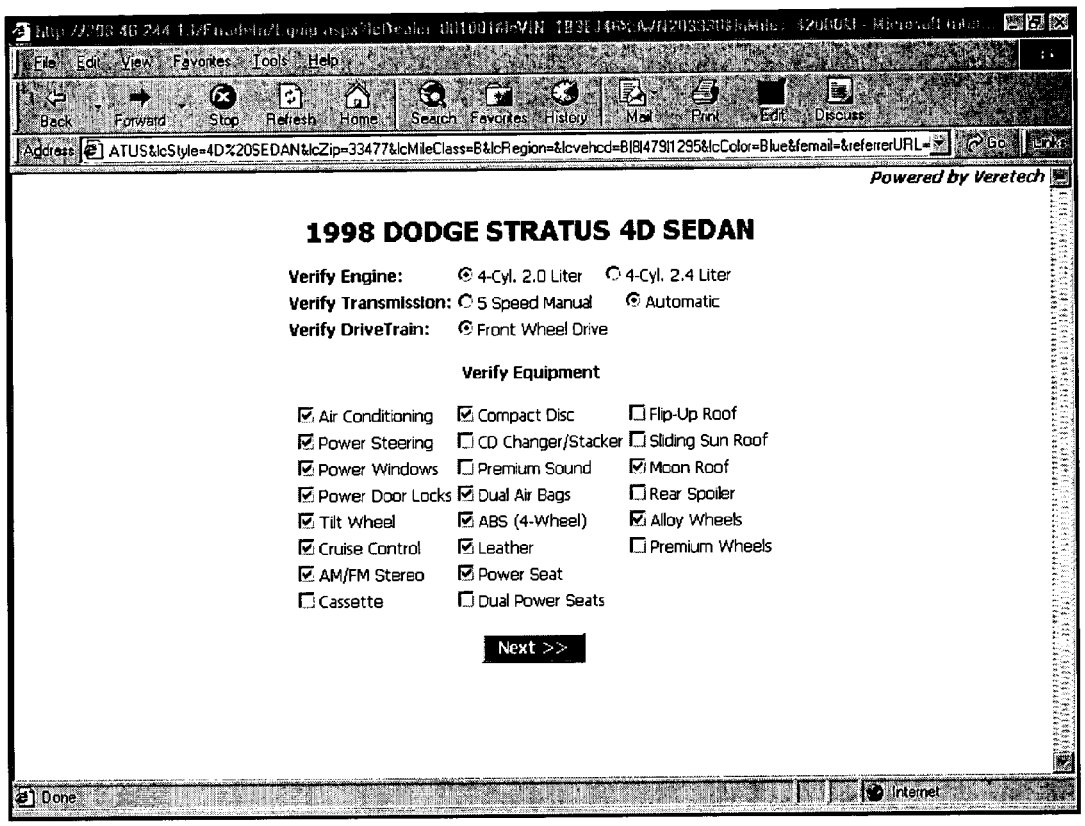
Figure 2H:
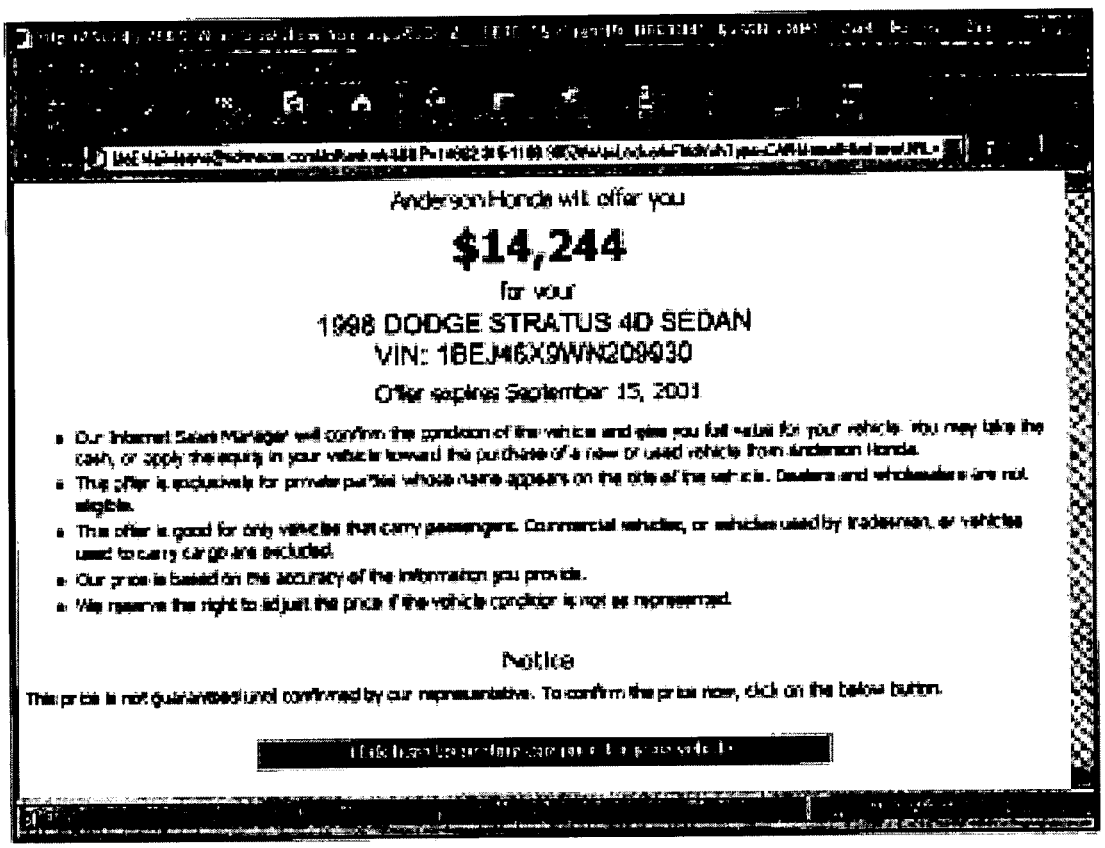
FIG. 2(h) is a computer screen shot of a preferred embodiment of a Web page demand certificate in accordance with the system of the invention.
Figure 3A:
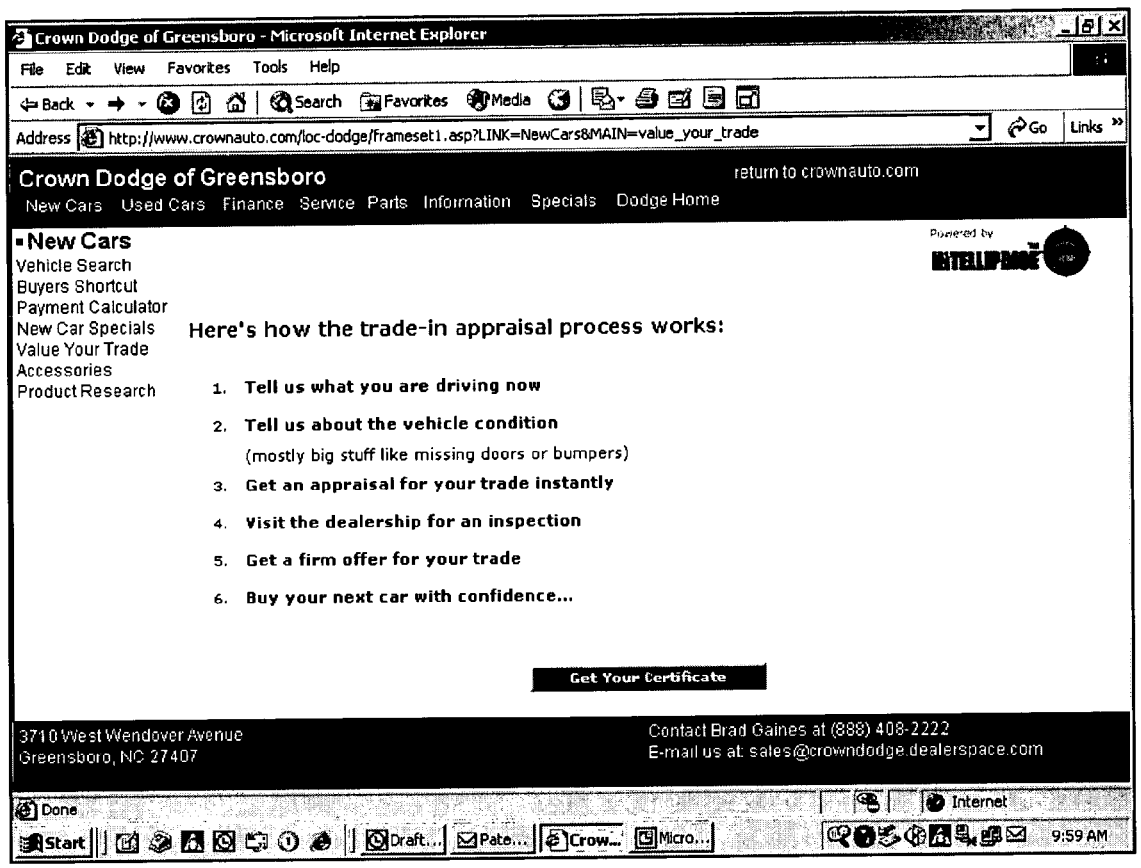
Figure 3B:
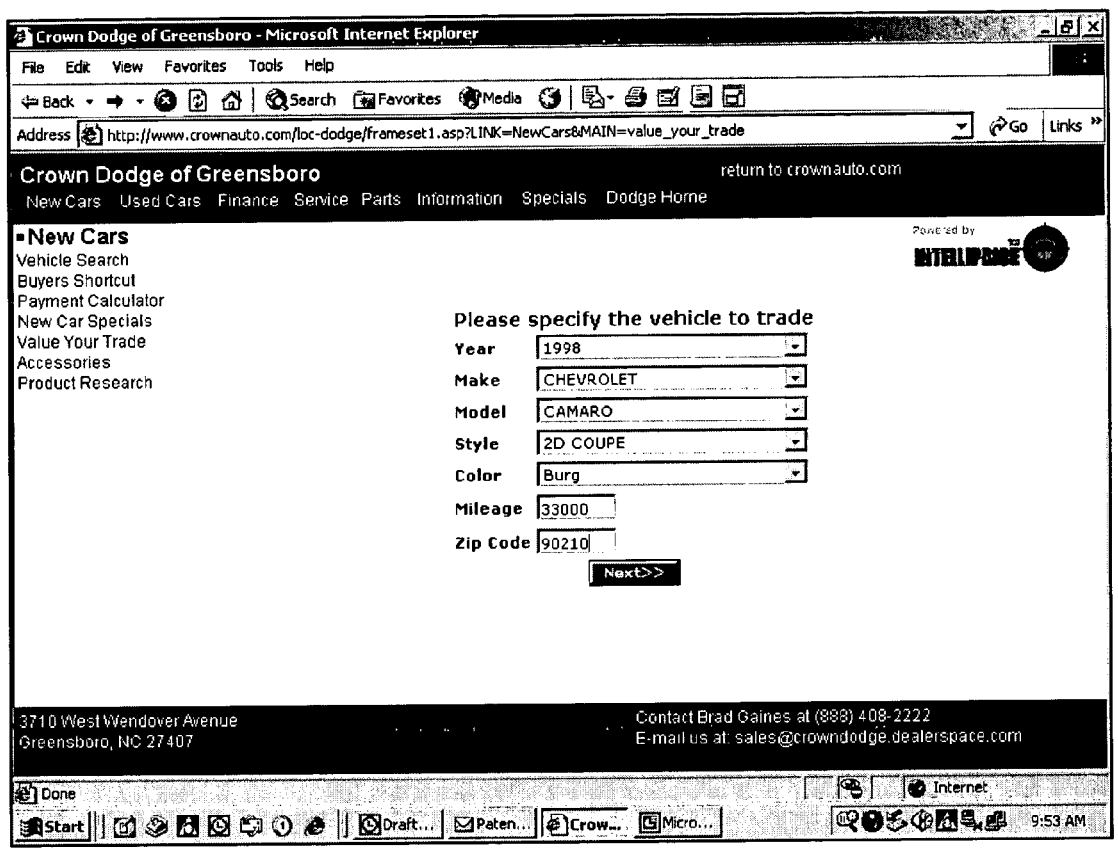
Figure 3C:
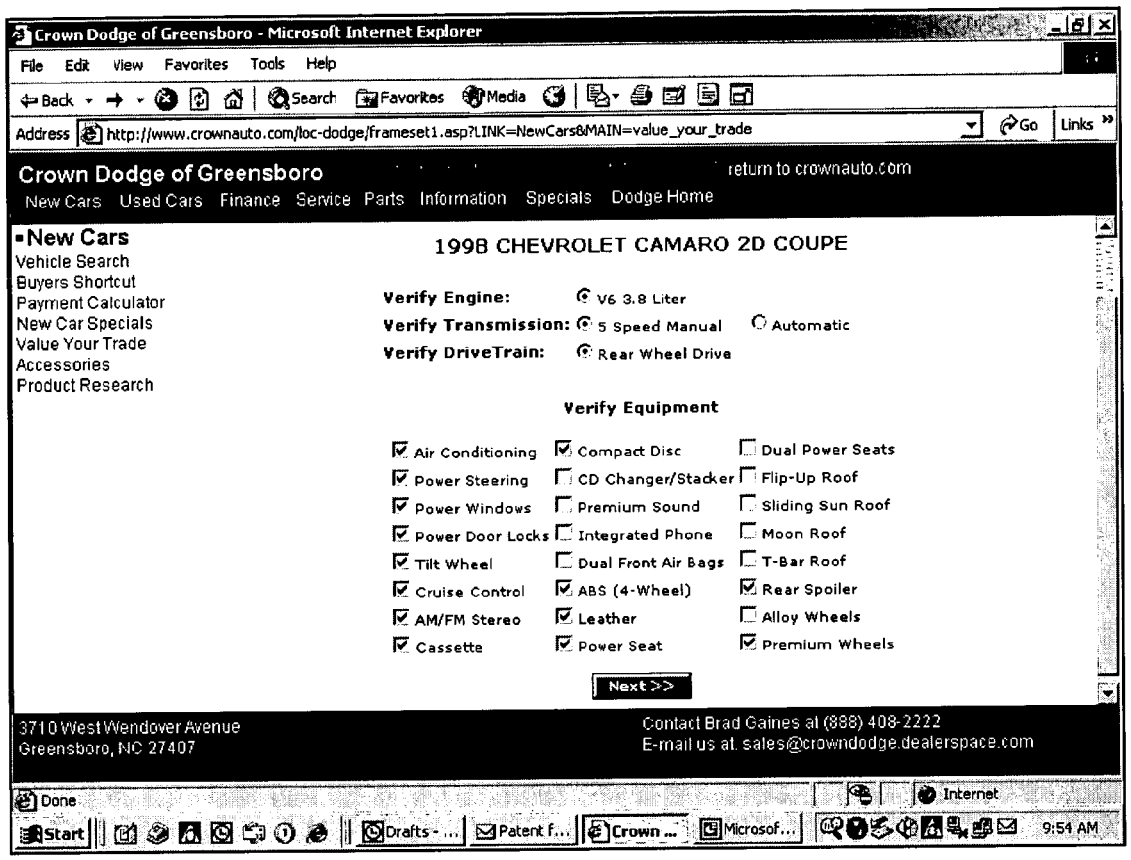
Figure 3D:
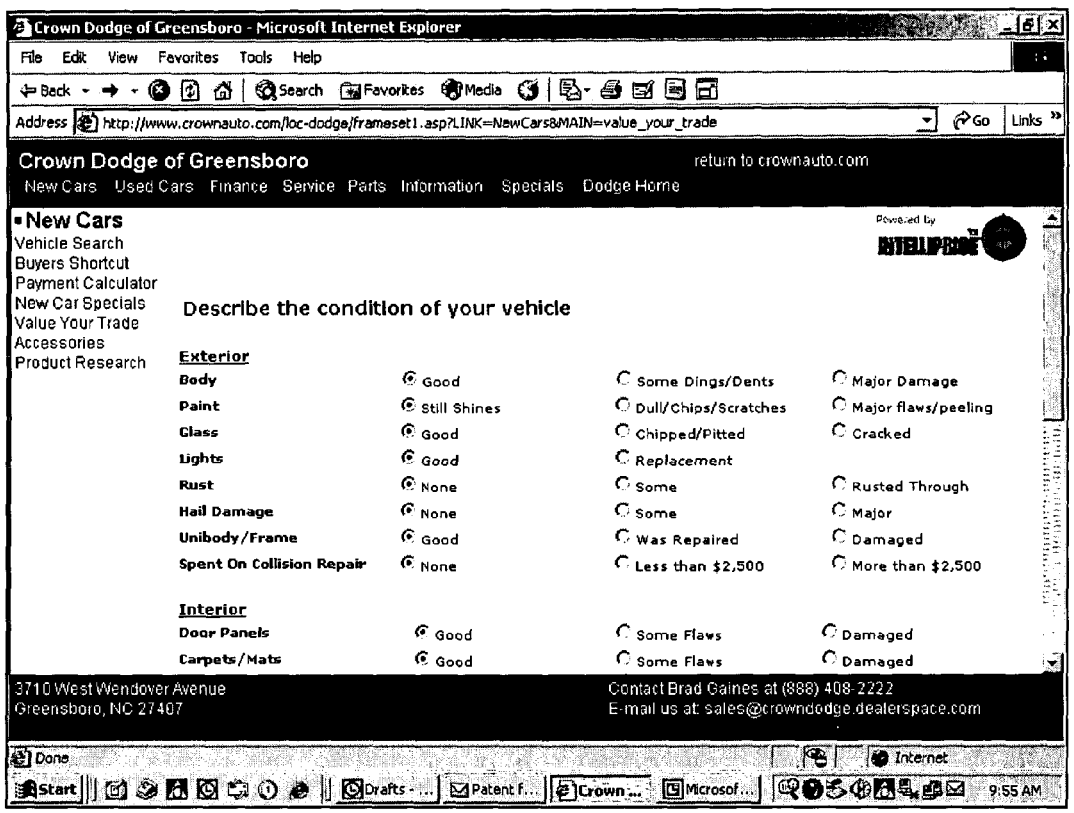
Figure 3E:
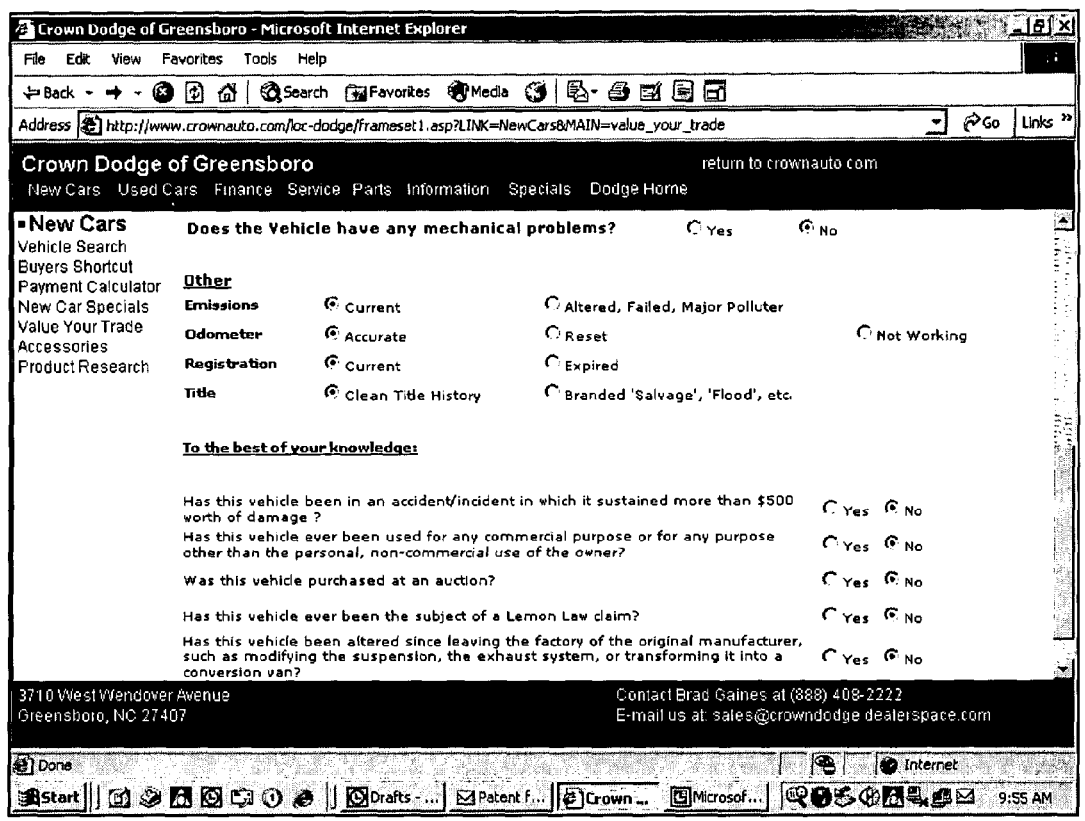
Figure 3F:
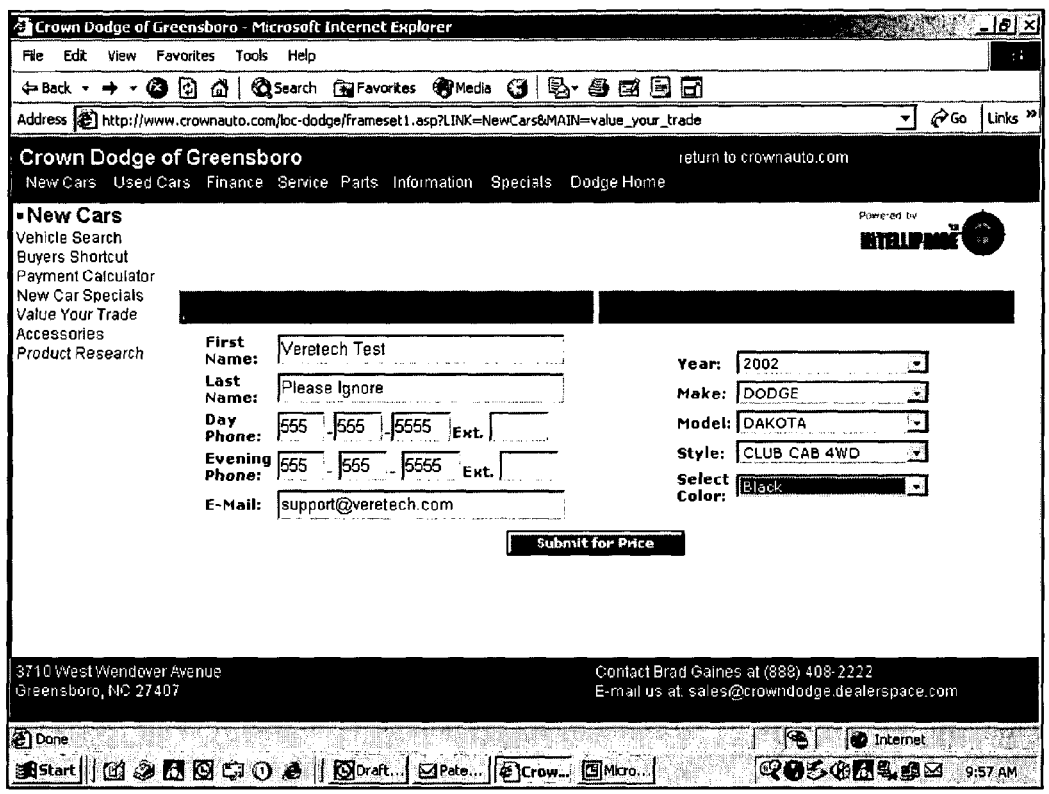
Figure 3G:
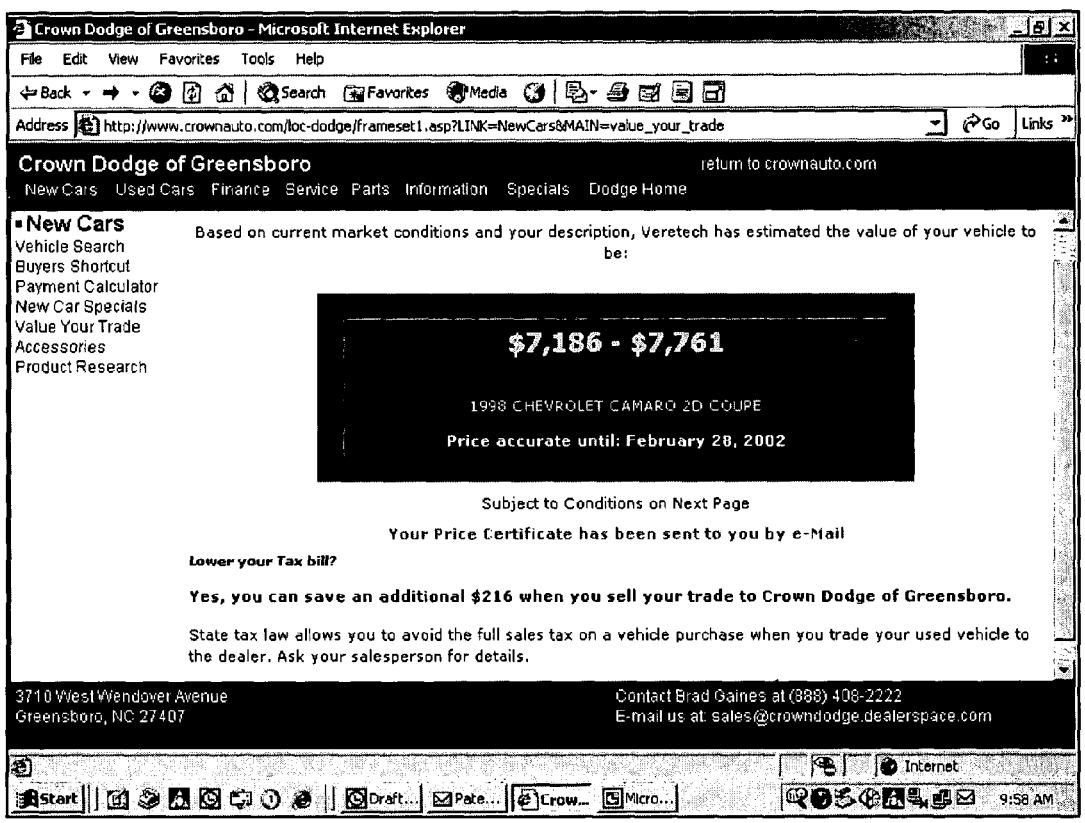
Figure 3H:
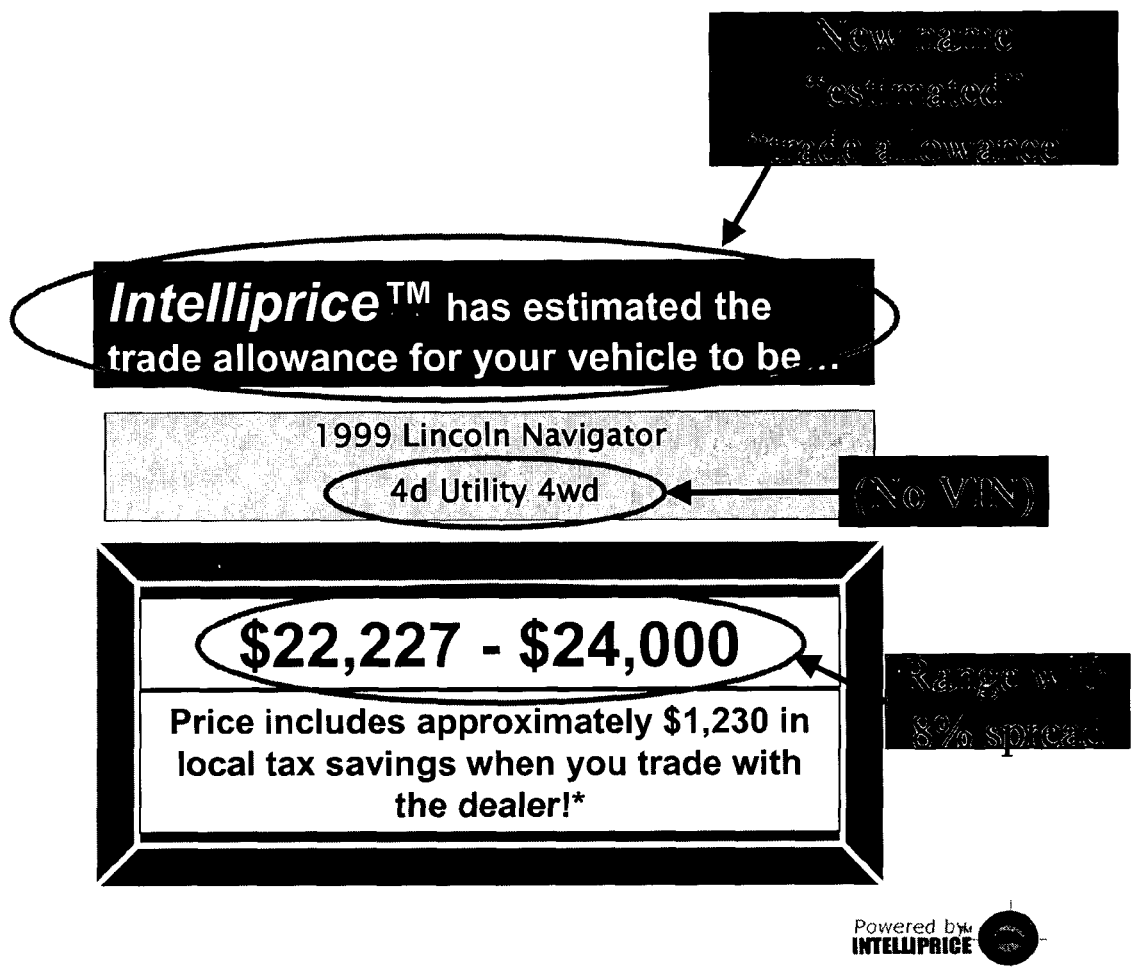

FIG. 1 is a schematic demonstrating the typical components used in a preferred embodiment of the invention when used over the Internet. Those of ordinary skill in the art will appreciate that the present invention, while described below in connection with its use over the Internet, is certainly not limited thereto.

As shown in FIG. 1, this embodiment of the invention includes Seller Access, which includes Document Viewer 1, Computer 2, and Network Connection 3 (described in more detail below), which allows sellers to access the system of the present invention. The seller is preferably a consumer but is not limited thereto and may be businesses, other dealers, etc. The present invention also preferably includes Buyer Access, which includes Document Viewer 4, Computer 5, and Network Connection 6.

Seller Access and Buyer Access communicate with each other and have their transaction facilitated by, Lead Generation System 7. Lead Generation System 7, preferably includes at least an Internet Web Server 8, a Data Source Interface 9, a Data Source 10, and an Email Server 11.

To input and extract information from Lead Generation System 7, an electronic document, such as a Web page, is loaded in a conventional manner into a Document Viewer. Each Document Viewer may be any software application capable of viewing electronic documents and loading additional electronic documents from within the original document, such as through the use of a hypertext link or form (although not limited thereto).

For example, the Document Viewer could include a Web browser, such as Navigator from Netscape Communications or Microsoft's Internet Explorer. The electronic document may be loaded automatically when the Document Viewer is first started, or may be opened into the viewer by the user from a file stored locally or at a remote address. For example, the user may load the document by typing the document's address into the Web browser's command line.

Each Document Viewer may be accessed by the user through any of a number of computer systems, such as through the use of a terminal connected to a mainframe system, from a personal computer, or over computer connected to a local computer network.

Each Document Viewer is connected to the Internet along with each respective Computer, through each Network Connection. The Network Connection is typically made through local telephone lines using an analog, ISDN, or DSL connection, though it can be over a direct network connection, such as an Ethernet network and leased line. Each Network Connection may be a computer network that routes any requests from each Document Viewer to the appropriate location on the Internet. This operation is well known to those of skill in the art. The Network Connection connects its Document Viewer to Web Server 8 in Lead Generation System 7 through any of a number of well-known connection schemes, such as through the use of leased lines.

Web Server 8 is typically a software application running on a computer that is capable of forwarding or processing requests from the Document Viewer. For example, Web Server 8 may include any one of a number of well-known server applications, such as the NSCA Web server, the Apache Web server, etc. Web Server 8 passes a document request from the Document Viewer to Data Source Interface 9 for accessing Data Source 10. Data Source 10 contains all of the information provided by the Seller or Buyer as described in more detail below.

After a document, such as an HTML form (or series of forms), is loaded into the Document Viewer, the Seller enters in the appropriate information and activates a hypertext link or form "Submit" button, generating a signal back to Data Source Interface 9, as described in more detail below. This is preferably in the form of an HTTP request sent over the Internet using TCP/IP and possibly a Secure Socket Layer ("SSL"). The request may be routed through the Network Connection and through Web Server 8 to Data Source Interface 9. It will be appreciated that the details of HTTP operation in conjunction with TCP/IP and SSL are well known to those of ordinary skill in the art and will, therefore, not be elaborated on here.

When the HTTP request is received by Data Source Interface 9, it may access Data Source 10 to retrieve requested information based upon the signal from the Document Viewer, may store information received from the Document Viewer, may perform calculations using the received information, or any combination of these steps. In one embodiment of the invention, a common gateway interface ("CGI") program, well known to those of skill in the art, may be used to parse the data from the Document Viewer. This program acts as an interface between the Web Server 8 and/or Data Interface 9 and Data Source 10 by executing a set of instructions. The interaction of Web servers and CGI programs and the sending of information therebetween is well known to those of ordinary skill in the art.

The CGI program may extract the document information from the information passed to it by the server and retrieve the appropriate information from Data Source 10. This may be accomplished in a number of ways known to those of ordinary skill in the art. For example, the CGI program may be a database access module of one of a number of commercial available relational database applications. Examples of such databases include Oracle, Sybase, SQL Server, and the like. It is also possible for these systems to be accessed directly by Web Server 8 using their own internal data engines.

Information is submitted to or extracted from Data Source 10, depending on the signal sent by the Document Viewer. Data Source Interface 9 then generates a signal back to the Document Viewer through Web Server 8. Email Server 11 may also be used to communicate with Buyer or Seller, preferably using a known transmission protocol, such as SMTP (Simple Mail Transfer Protocol) or by posting the information to a Web site where the recipient's application may process it further.

FIGS. 2(*a*)–(*f*), 3(*a*)–(*g*), and 4(*a*)–(*e*) illustrate preferred embodiments of Web page forms used to submit the vehicle identifying and condition information to Lead Generation System 7. As shown in the Figures, the first of these forms preferably describes how the process works, what is required by the Seller, and any industry specific disclaimers to deal with existing commercial codes that affect the retail sale of vehicles, such as automobiles.

As shown also shown in the figures, the Seller is then asked to provide the vehicle identification information, such as the vehicle identification number (VIN) in the case of an automobile. While the make, model, style, and year of the vehicle may also be provided, this identifying information can also be determined from the vehicle records for the vehicle under the VIN. This information may be obtained, for example, from the Black Book, well known in art, which contains a breakdown of each manufacturer's VIN information, and may be stored in Data Source 10. It is also possible for VIN related information to be maintained by the state department of motor vehicles for the state in which the vehicle is registered and obtained in any number of ways well known to those of ordinary skill in the art, such as through direct access to the department's online database.

The Seller may then be prompted to indicate the "trim level" of the vehicle, i.e. the optional equipment or option packages with which the vehicle was equipped when it left the factory. The Seller may also be prompted to provide the number of miles that the vehicle has been driven since new. Finally, the Seller may be prompted for his/her zip code. The seller's zip code may then be matched with a dealer, based upon the dealer's zip code (which may be stored in Data Source 10). The zip code of the dealer is often an important factor to consider in establishing an accurate value for a vehicle.

The Seller may also be presented with a list of options that are standard trim packages for the vehicle, as well as a number of the most common options that may have been added to the vehicle. This gives the Seller the ability to describe the components of the vehicle in the most comprehensive and accurate manner, and helps to ensure that all of the options installed on the vehicle are taken into account when its value is being calculated.

The Seller may then be prompted to record an observation of the condition of the vehicle on a questionnaire. The questionnaire electronically emulates the process of the used car appraisal that is traditionally performed in person at the dealership. All condition flaws are noted, whether physical or mechanical, that might reduce the current wholesale market value of the vehicle. As each portion of the vehicle is reviewed, the consumer is prompted to comment on its condition, such as being "like new", "fair", or "damaged". If the Seller marks any item as being something other than "like new", the questionnaire can be expanded to probe more thoroughly as to what the exact flawed component is, and to record its current condition in greater detail.

Once all of the vehicle identifying and condition information has been provided, Lead Generation System 7 may prompt the Seller for contact information, including name, street address, phone number, and email address. Valuation System 7 may also prompt the Seller to describe the new (or at least replacement) vehicle that the Seller is seeking. This information can also be used to generate the lead to the dealer. The Buyer (dealer) can contact the Seller in order to follow up on the Seller's interest and intent in disposing of the vehicle and procuring another one.

Once all of this information has been received by Lead Generation System 7, Valuation System 7 may access Auction Data Source 12 to obtain the relevant historical data, such as wholesale sales that occur at vehicle auctions and dealerships, for vehicles related to the vehicle that the Seller is offering or at least valuing for sale. Auction Data Source 12 may comprise a single database of auction records or may comprise multiple sources of auction related information. Of course, this information may be manually entered into Valuation System 7, as well. For example, this information may be obtained from a variety of industry sources, such as Manheim, ServNet, ADESA, and/or Digital Microworks.

Once the historical data has been received, it may be used, along with vehicle identifying and condition information by Lead Generation System 7 to calculate an estimated value for the vehicle in real time. For example, one manner in which the estimated value may be calculated is by taking the historical information to determine a base value, adding for optional equipment, subtracting for excess mileage, and subtracting for physical and mechanical condition flaws. Preferably, Lead Generation System 7 will calculate the current average wholesale value for each vehicle based on auction results of the last few weeks within the geographic region of the dealership (Buyer).

Alternatively, the information may be sent to the Buyer to separately calculate a value for the vehicle. This information may be transmitted to the Buyer through any of a number of conventional means, such by email using Email Server 11, or by a facsimile generated by Lead Generation System 7 in a manner well known to those of ordinary skill in the art.

Lead Generation System 7 may then generate an offer price or estimated value for the vehicle using the initially determined value. This offer price may then be submitted by the Buyer to Lead Generation System 7, such as through the use of a Web page in a Document Viewer using Web Server 8 or by an email using Email Server 11. Lead Generation System 7 may then transmit this offer price to the Seller, similarly through a Web page in the Document Viewer using Web Server 8, or by an email using Email Server 11. This offer price may take the form of a demand certificate that the Seller can print and take to the Buyer to accept the offer or to keep in the Seller's records. An example of a demand certificate is shown in FIG. 8.

In the preferred embodiment of the invention, however, before submitting the offer price to the Buyer, Lead Generation System 7 may refine the price using any of a number of buyer criteria. The buyer criteria are preferably stored in Data Source 10 in a profile for each participating Buyer (dealer). These buyer criteria may comprise a set of rules selected by the dealer when establishing his/her profile in Data Source 10. The dealer profile may be established using an interactive set of web page forms.

The actual buyer criteria may comprise an number of factors, such as the "black book" value, well known to those of ordinary skill in the art, or offsets to price determined by trade-in or inventory incentives, etc. These may be selected (and modified) by the dealer from a list of items provided through the interactive Web forms.

For example, the buyer criteria may include a price control option, wherein pricing is restricted to a maximum of some predetermined percentage (preferably 0 to 10%) above the average price provided in the Black Book, NADA, or Kelley Blue Book; or the average wholesale price. This is further illustrated in Table 1.

TABLE 1

| Appraisal Value: | | Discount: | |
| --- | --- | --- | --- |
| From $5,000 | to $10,000 | reduce price by | $500 |
| From $10,001 | to $18,000 | reduce price by | $700 |
| From $18,001 | to $25,000 | reduce price by | $1,000 |
| From $25,001 | to $40,000 | reduce price by | $1,500 |

Vehicle specific buyer criteria may also be used. In other words, the average wholesale (auction) price on each vehicle may be reduced or increased a percentage based upon the Year, Make, Model, Style, and/or Color of the vehicle. These pricing rules will be used in addition to the general rules noted above.

Vehicles matching certain historical concerns may also be excluded from the aforementioned price adjustments, or even denied an offer/value altogether. Such historical concerns could include, for example, vehicles that have been used for commercial purposes, vehicles used by tradesmen, vehicles used to carry cargo, vehicles older than 1994 model year, vehicles with major damage or excessive condition flaws, vehicles with major hail damage or rust, vehicles that have sustained previous damage exceeding $2,500, vehicles with excessive mechanical problems, vehicles with faulty or inoperative odometers, and/or vehicles that have branded or salvage titles.

An offset for state sales tax may also be used as buyer criteria for modifying the offer to the Seller. For example, state tax tables can be used to show the difference between the tax on the purchase of a new car and the purchase of a used car. This difference may also be used to modify the offered value for the used vehicle accordingly. The estimated value may be provided, and the tax savings for that state may also be shown.

Figure 4A:
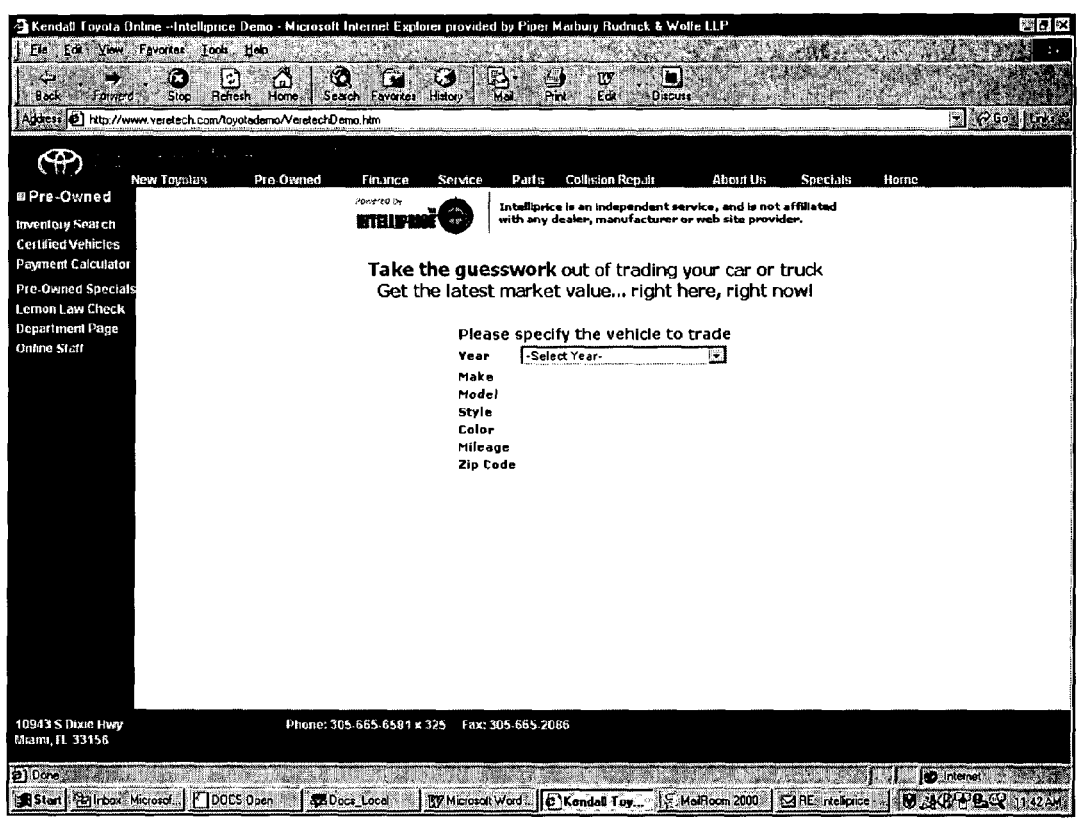
Figure 4B:
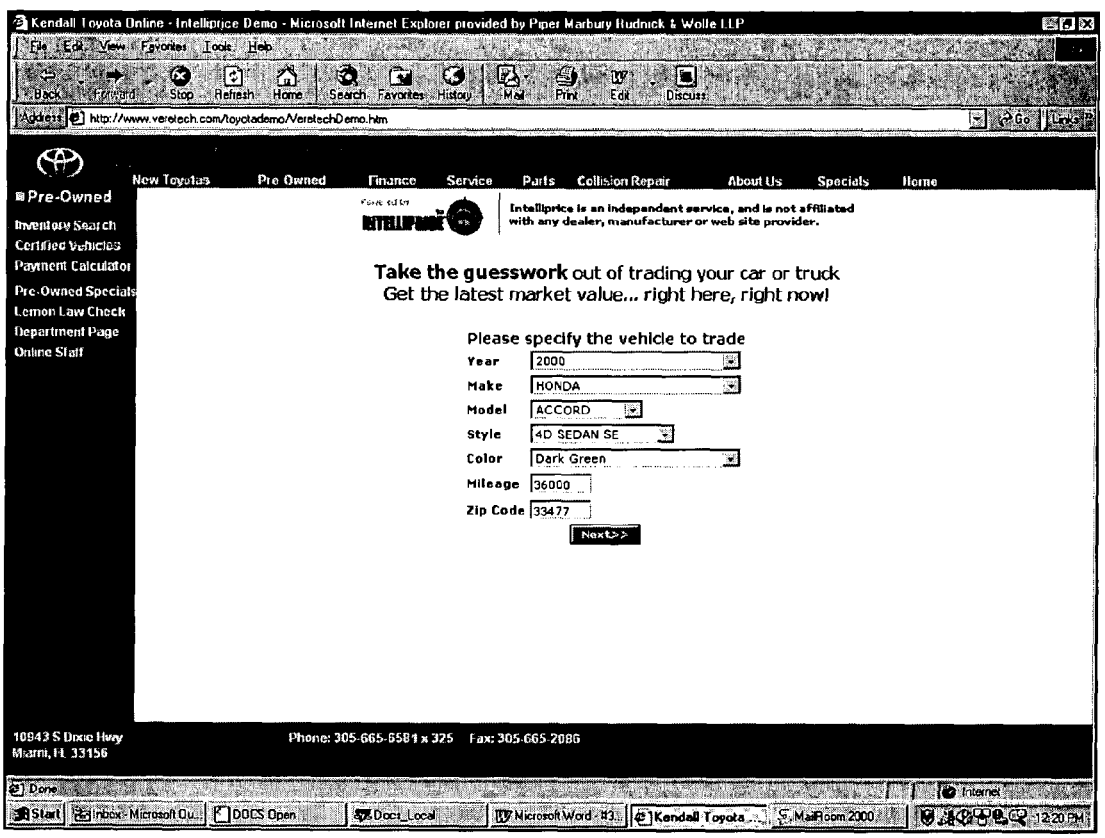
Figure 4C:
Figure 4D:
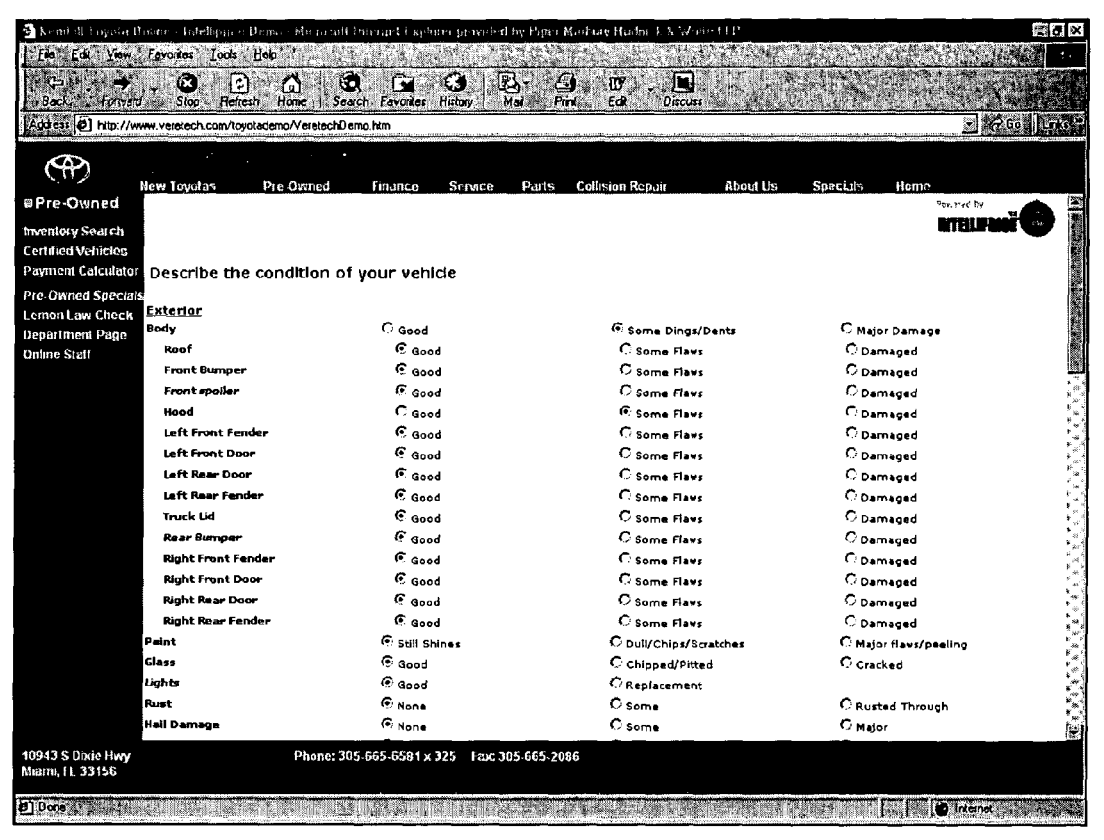
Figure 4E:
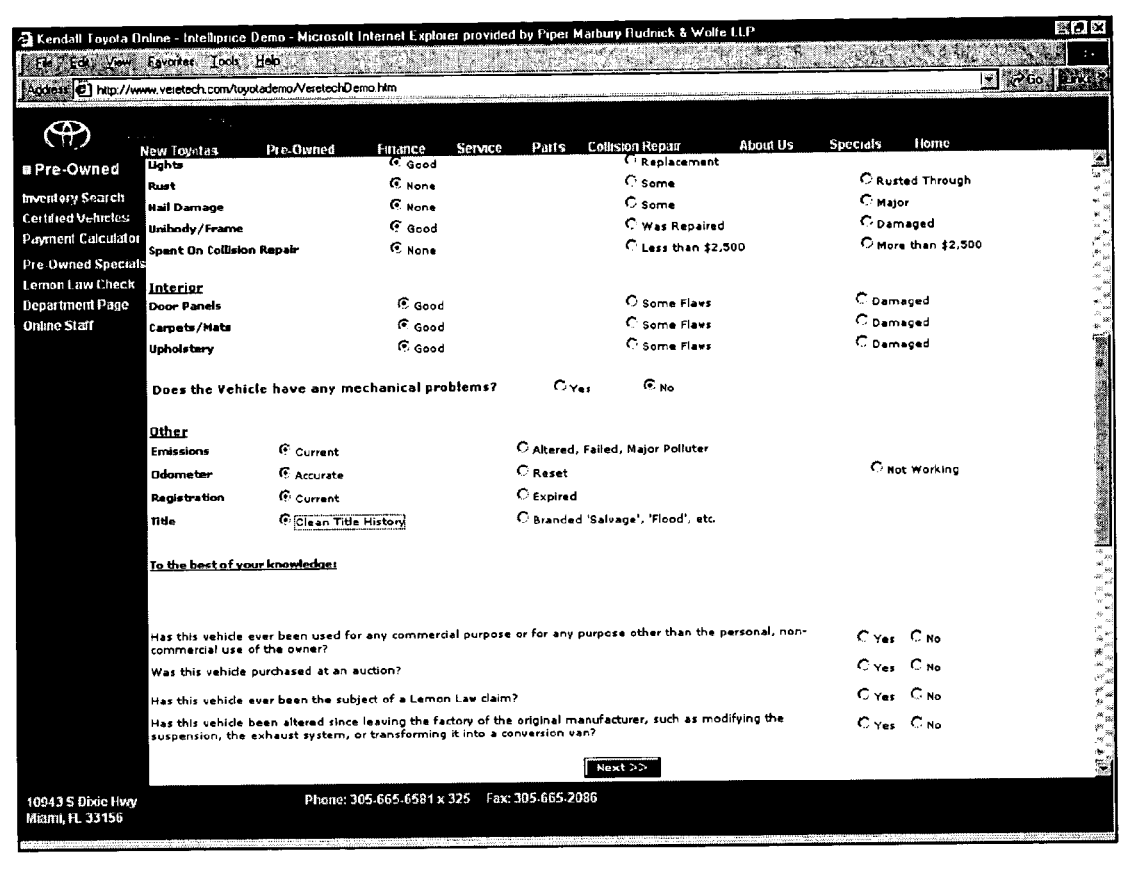
Figure 4F:
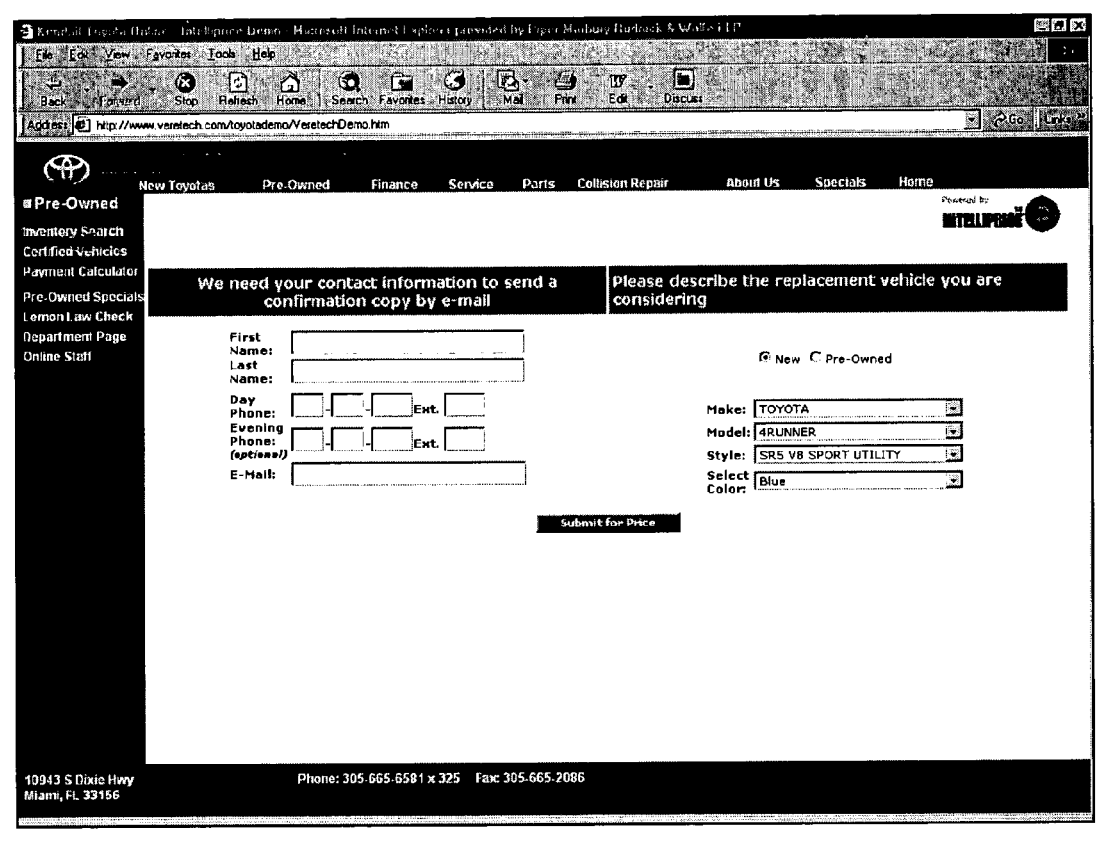
Figure 4G:
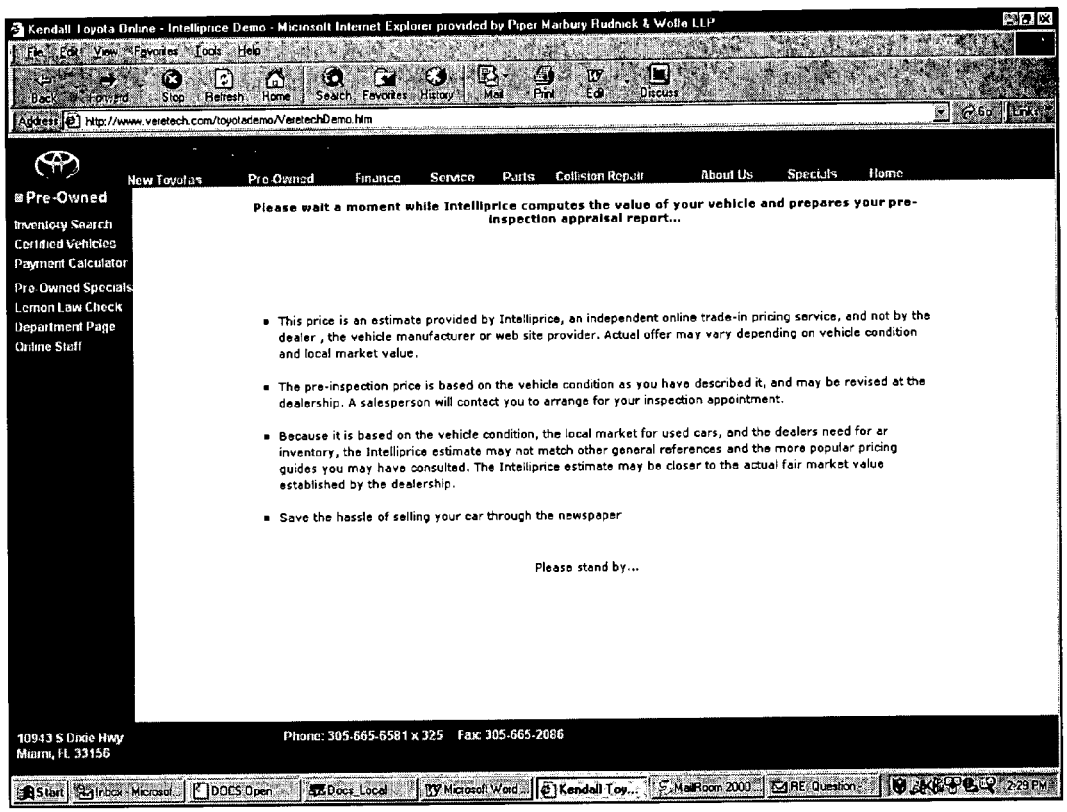
FIGS. 4(g)–(h) are computer screen shots of status message Web pages in accordance with the system of the invention.
Figure 4H:
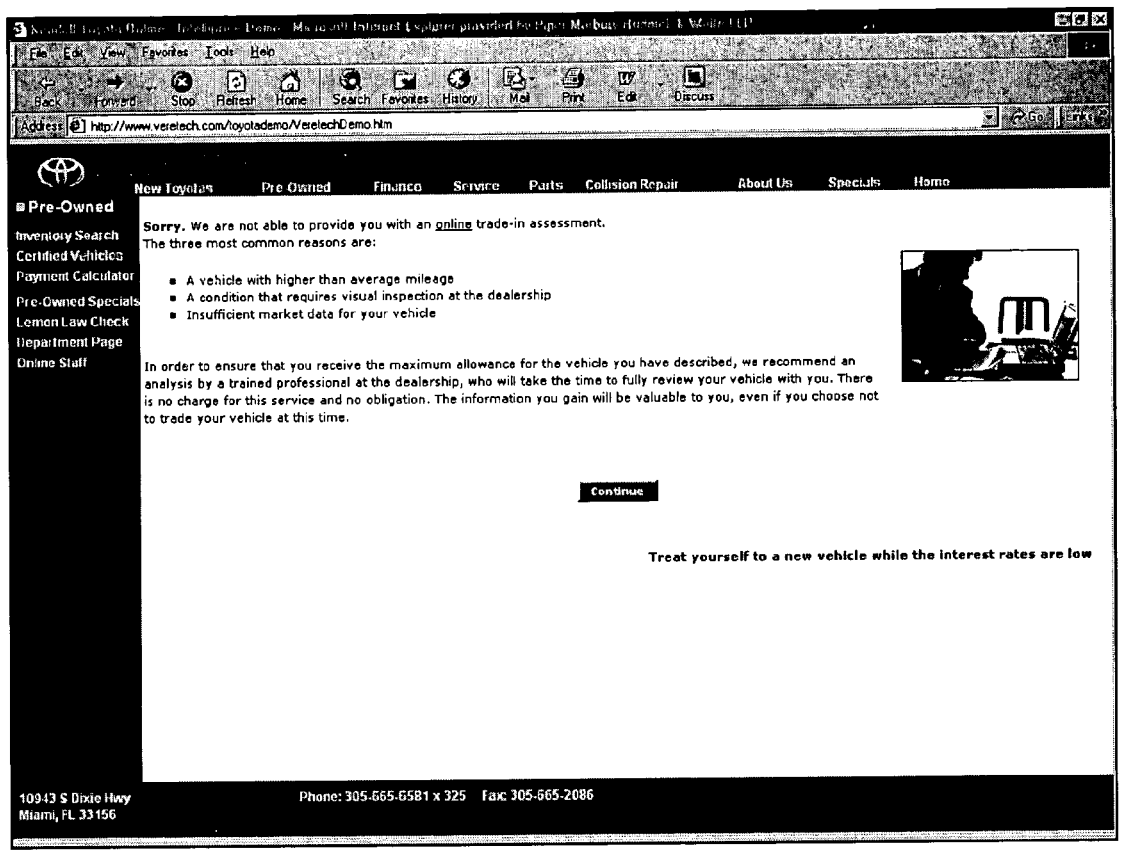
Figure 4I:
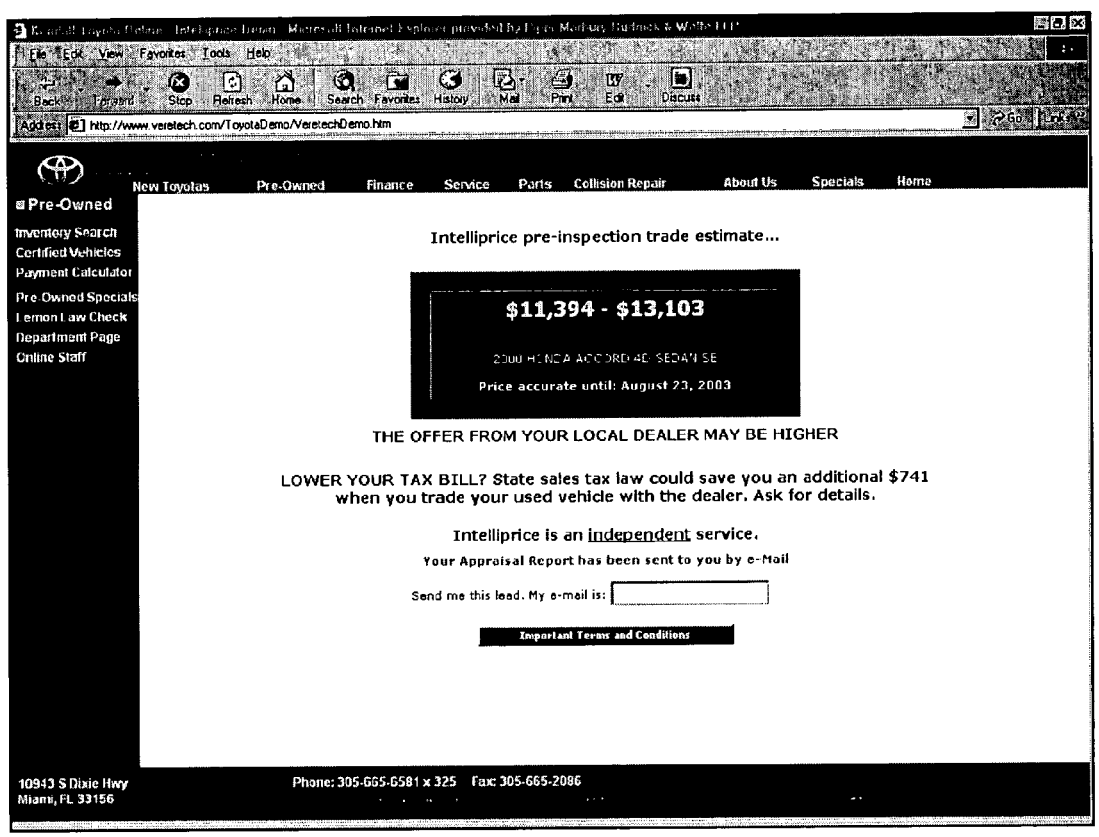
Figure 4J:
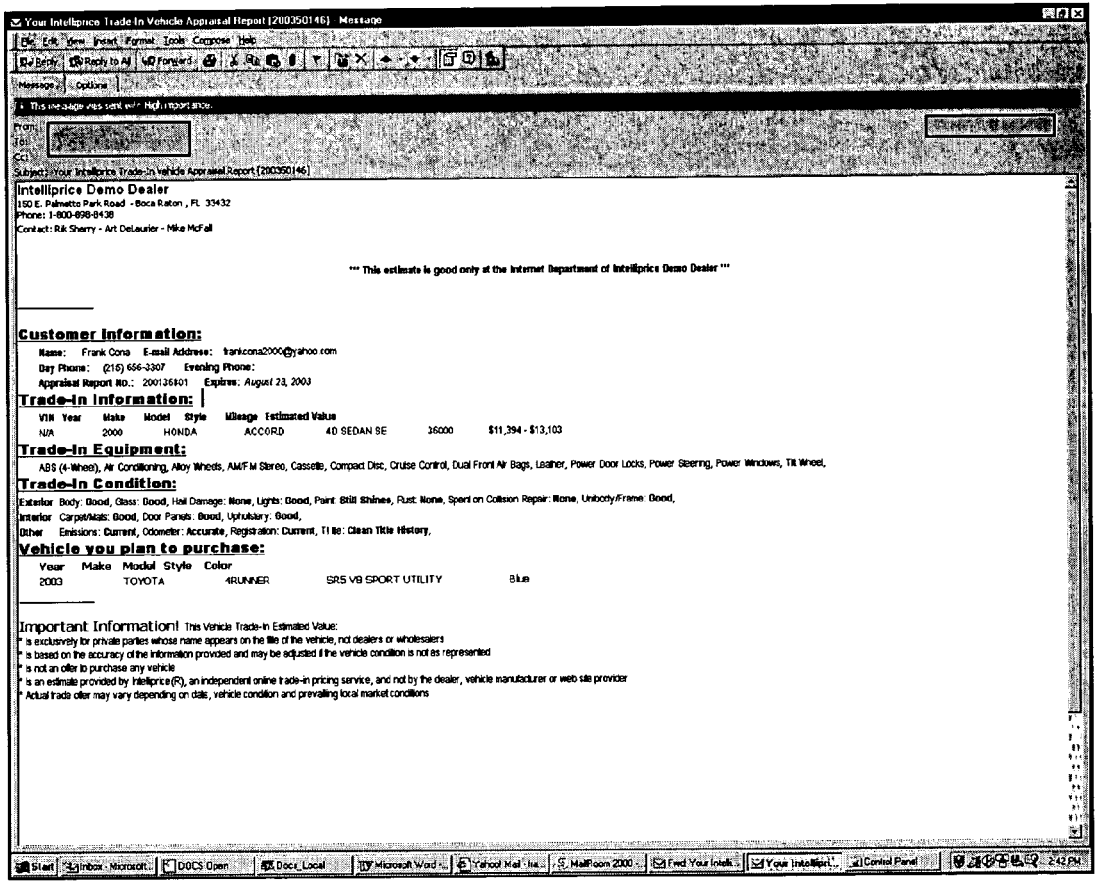

In one embodiment, such as is shown in FIG. 4(i), for example, this value may be presented to the Seller so as to clearly demonstrate that it is independently generated (i.e., not calculated by the dealer whose Web site the Seller has accessed or to whom the Seller may be in contact regarding the sale or disposition of the vehicle). This provides the significant advantage of greatly increasing the Seller's willingness to rely on the value provided and the perception that the value is fair, accurate, and/or unbiased. This, in turn, increases the chances that the Seller will approach that dealer.

Alternatively, however, the entire process may be done in a private labeling manner, so that the Seller is unaware that Lead Generation System 7 is calculating the estimated value independently of the dealer (if that is the case).

Once the lead is generated by Lead Generation System 7, it may then be provided to the Buyer (dealer) in any number of conventional manners (such as the systems described above), and stored locally by the Buyer in the dealer's own database. The lead is preferably transferred and stored in a format known and used by the industry and usable by known lead management software, such as Applied Virtual Vision, Sale Enhancer, DealerPoint, and/or Car Client.

As noted above, in one preferred embodiment, the system of the invention may calculate an estimated value for a vehicle without requiring the VIN from the Seller. The Seller need merely insert the Year, Make, Model, Trim, Mileage and/or Zip. With advanced data mining techniques, the invention can derive the value at the auction, just as accurately as it would have had the VIN been used. This is a significant advantage. Many consumer don't have their VIN handy or just considered using the VIN too laborious to bother with. By eliminating this step, many more consumers will be able to use the invention.

As also discussed above, the system of the invention may provide an estimated value rather than an actual offer from the dealer to buy the vehicle. This has the significant advantage that the dealer will feel more comfortable about what is expressed to the consumer. Because sales tax savings may be added to the estimated value of the vehicle in order to maximize the value expressed to the consumer, this value is preferably shown as an estimated trade allowance rather than an actual offer to purchase the vehicle.

In addition, it is possible that a consumer may be disappointed with a proposed trade-in value that reflects a lower, wholesale value, and they may decline to engage in a dialog with dealership sales personnel. For example, depreciation rates on 2000 and 2001 vehicles, particularly SUVs have been extremely steep. Many consumers find that they owe more than their vehicle is worth. To remedy this situation to some degree, the estimated value of the invention be expressed as a range of estimated value of the vehicle. The low end of the range can be the wholesale value that is derived from the auction data from wholesales sales that occur at auto auctions and/or dealerships. A range can then be set above that value (such as 8–10%, depending on the dealer's preference), and the high end of the range is calculated.

Thus, a vehicle whose wholesale value at the auction or automobile dealership is $16,000 might have an estimated value of "16,000 to $17,600". This range serves the dealer by expressing the true wholesale value, and serves the consumer by stretching the value closer to what they desire from their trade. In practice, if a dealer is keeping the vehicle for his retail lot, he is more apt to make the offer closer to high end of the range. The vehicle, in this case, will probably be about $19,800 at the retail sale. There is still plenty of profit and the dealer makes two customers (the original seller and the subsequent buyer of the used vehicle) very happy. An example of how this pricing page is broken down is illustrated in FIG. 9.

Although this invention has been described with reference to particular embodiments, it will be appreciated that many variations may be resorted to without departing from the spirit and scope of this invention. For example, while the present invention has been described in connection with lead generation from the valuation of automobiles, it is not limited thereto and may include any vehicle that is capable of being valued using historical sales data and specific vehicle history, such as motorcycles, mobile homes, boats and personal watercraft. Also the system of the present invention may be implemented over a local network or virtual private network or any internet worked system, and is not limited to the Internet.

What is claimed is:

1. A method of generating sales leads as a service for one or more vehicle dealerships that are not otherwise affiliated with the service, the method comprising:

maintaining a web site independently of the one or more dealerships that is accessible over a computer network by a consumer who may be considering selling or trading in a first vehicle and potentially purchasing a second vehicle;

offering to the consumer while the consumer is accessing the web site to provide the consumer with an estimated value of the first vehicle, wherein the consumer must provide the consumer's contact information before the estimated value is provided;

maintaining one or more processors in association with the web site, the one or more processors performing the following steps (a) receiving information indicative of the first vehicle transmitted from the consumer over the computer network, the information indicative of the first vehicle comprising one or more selected from the group consisting of make, model, options and condition of the first vehicle, (b) receiving contact information of the consumer transmitted from the consumer over the computer network, (c) determining, independently of the one or more vehicle dealerships, the estimated value of the first vehicle by comparing the information indicative of the first vehicle received from the consumer against a database of vehicle value information contained in one or more data sources maintained in communication with the processor, (d) providing the estimated value of the first vehicle over the computer network to the consumer such that it appears to the consumer that the estimated value has been generated by an entity that is independent from and non-affiliated with the one or more dealerships, and (e) actively transmitting the contact information of the consumer and the estimated value of the first vehicle to the one or more vehicle dealerships as a sales lead; and the one or more vehicle dealerships and consumer following up with one another about the one or more dealerships potentially purchasing the first vehicle from the consumer, or the consumer using the first vehicle as a trade in, and the one or more dealerships potentially selling the second vehicle or another vehicle to the consumer.

2. The method of claim 1, wherein the step of determining the estimated value of the first vehicle comprises considering buyer criteria selected from the group consisting of a price control option, vehicle specific criteria, historic vehicle issues, and a price offset for state sales tax.

3. The method of claim 1, wherein the step of determining the estimated value of the first vehicle comprises considering historical data, adding for optional equipment, subtracting for excess mileage, and subtracting for physical and/or mechanical condition flaws.

4. The method of claim 1, wherein said vehicle identifying information is used to generate an appraisal report.

5. The method of claim 1, wherein said estimated value is determined as an estimated value range.

6. The method of claim 5, wherein a low end of said range is a wholesale value derived from auction data from wholesales vehicle sales, and a high end is calculated as a percentage above said low end range.

7. The method of claim 6, wherein said percentage is between about 8 to 10 percent.

8. The method of claim 1, wherein said estimated value is provided as a trade-in allowance accounting for state sale tax.

9. The method of claim 1, wherein the consumer's contact information comprises one or more selected from the group consisting of name, street address, phone number, and email address.

* * * * *